US011235852B2

(12) United States Patent
Behr et al.

(10) Patent No.: US 11,235,852 B2
(45) Date of Patent: Feb. 1, 2022

(54) BIDIRECTIONAL HATCH FOR PASSENGER REST COMPARTMENT

(71) Applicant: Rockwell Collins, Inc., Cedar Rapids, IA (US)

(72) Inventors: Nicolas Behr, Kirkland, WA (US); Daniel N. Moe, Mukilteo, WA (US); David Barrett, Cedar Rapids, IA (US)

(73) Assignee: B/E Aerospace, Inc., Winston-Salem, NC (US)

(*) Notice: Subject to any disclaimer, the term of this patent is extended or adjusted under 35 U.S.C. 154(b) by 650 days.

(21) Appl. No.: 16/127,088

(22) Filed: Sep. 10, 2018

(65) Prior Publication Data
US 2020/0180747 A1 Jun. 11, 2020

Related U.S. Application Data

(60) Provisional application No. 62/729,237, filed on Sep. 10, 2018.

(51) Int. Cl.
B64C 1/14 (2006.01)
B64D 11/00 (2006.01)
B64C 1/32 (2006.01)

(52) U.S. Cl.
CPC ............ *B64C 1/1423* (2013.01); *B64D 11/00* (2013.01); *B64C 1/32* (2013.01); *B64D 2011/0084* (2013.01)

(58) Field of Classification Search
CPC .... B64D 2011/0046; B64D 2011/0084; B64D 2011/0069; B64D 2011/0076; B64D 11/00
See application file for complete search history.

(56) References Cited

U.S. PATENT DOCUMENTS 2,455,157 A 11/1948 Bigelow
3,044,419 A 7/1962 Majnoni
(Continued)

FOREIGN PATENT DOCUMENTS

WO 2019207211 A1 10/2019

OTHER PUBLICATIONS

International Search Report and Written Opinion dated Dec. 27, 2019 for PCT/US2019/050357.
(Continued)

Primary Examiner — Brian M O'Hara
(74) Attorney, Agent, or Firm — Suiter Swantz pc llo

(57) ABSTRACT

A bi-directional egress hatch for a passenger aircraft may allow passengers to rapidly and safely exit an overhead cabin of the aircraft onto the main deck, while allowing cabin crew to safely ascend into the overhead cabin if need be. Hatch panels may blend in with overhead bin doors and ceiling panels of the main cabin; the inner portions of the hatch panels (facing the overhead cabin) may include anti-skid portions and graspable handles for descending passengers. The hatch may be easily activated by a passenger with a single motion (or remotely activated, or autodeployed). Once activated, the hatch panels may swing open and a telescoping ladder may deploy from the inner portion to the main deck, remaining rigid once reaching the floor. Similarly, any barriers protecting the ladder from passengers in the overhead cabin may be released, granting access to the telescoping ladder.

18 Claims, 12 Drawing Sheets

(56) References Cited

U.S. PATENT DOCUMENTS

| | | | |
|---|---|---|---|
| 3,144,224 A * | 8/1964 | Carroll | B64C 1/32 244/129.5 |
| 5,496,000 A | 3/1996 | Mueller | |
| 5,651,733 A | 7/1997 | Schumacher | |
| 5,784,836 A | 7/1998 | Ehrick | |
| 6,003,813 A * | 12/1999 | Wentland | B64D 11/00 244/118.5 |
| 6,073,883 A | 6/2000 | Ohlmann et al. | |
| 6,152,400 A | 11/2000 | Sankrithi et al. | |
| 6,182,926 B1 | 2/2001 | Moore | |
| 6,305,645 B1 | 10/2001 | Moore | |
| 6,393,343 B1 | 5/2002 | Frey et al. | |
| 6,464,169 B1 | 10/2002 | Johnson et al. | |
| 6,520,451 B1 | 2/2003 | Moore | |
| 6,616,098 B2 | 9/2003 | Mills | |
| 6,659,225 B2 | 12/2003 | Oliges et al. | |
| 6,772,977 B2 | 8/2004 | Dees et al. | |
| 6,808,142 B2 | 10/2004 | Oki | |
| 6,848,654 B1 | 2/2005 | Mills et al. | |
| 6,932,298 B1 | 8/2005 | Mills | |
| 6,986,485 B2 | 1/2006 | Farnsworth | |
| 7,088,310 B2 | 8/2006 | Sanford | |
| 7,156,344 B1 | 1/2007 | Guering | |
| 7,290,735 B2 | 11/2007 | Saint-Jalmes et al. | |
| 7,354,018 B2 | 4/2008 | Saint-Jalmes | |
| 7,389,959 B2 | 6/2008 | Mills | |
| 7,762,496 B2 * | 7/2010 | Seiersen | B64D 11/00 244/118.5 |
| 7,823,831 B2 | 11/2010 | Guering | |
| 7,942,367 B2 | 5/2011 | Saint-Jalmes et al. | |
| 8,152,102 B2 * | 4/2012 | Warner | B64D 11/00 244/118.5 |
| 8,162,258 B2 | 4/2012 | Joannis et al. | |
| 8,328,137 B2 * | 12/2012 | Sutthoff | B64C 1/1446 244/129.5 |
| 8,534,602 B2 * | 9/2013 | Jakubec | B64D 11/00 244/118.5 |
| 8,602,354 B2 | 12/2013 | Sutthoff et al. | |
| 8,727,277 B2 | 5/2014 | Guering et al. | |
| 8,794,569 B1 | 8/2014 | Ohlmann et al. | |
| 8,844,865 B2 | 9/2014 | Gehm et al. | |
| 8,881,524 B2 | 11/2014 | Andres et al. | |
| 8,905,633 B2 | 12/2014 | Popp et al. | |
| 8,991,756 B2 | 3/2015 | Papke | |
| 9,169,021 B2 | 10/2015 | Pozzi et al. | |
| 9,340,294 B1 | 5/2016 | Keleher et al. | |
| 9,403,465 B2 | 8/2016 | Kircher et al. | |
| 9,456,184 B2 | 9/2016 | Barrou et al. | |
| 9,545,998 B2 | 1/2017 | Lin | |
| 9,550,571 B1 | 1/2017 | Ohlmann et al. | |
| 9,706,242 B2 | 7/2017 | Dame et al. | |
| 9,708,065 B2 | 7/2017 | Sankrithi et al. | |
| 2005/0057344 A1 | 3/2005 | Davis et al. | |
| 2005/0178909 A1 | 8/2005 | Mills et al. | |
| 2006/0235753 A1 | 10/2006 | Kameyama | |
| 2007/0034212 A1 | 2/2007 | Bendley et al. | |
| 2007/0125909 A1 | 6/2007 | Seiersen et al. | |
| 2010/0140402 A1 | 6/2010 | Jakubec et al. | |
| 2010/0301163 A1 | 12/2010 | Guering et al. | |
| 2011/0139930 A1 | 6/2011 | Sutthoff et al. | |
| 2011/0253005 A1 | 10/2011 | Sun et al. | |
| 2013/0120162 A1 | 5/2013 | Stehman et al. | |
| 2013/0257688 A1 | 10/2013 | Yamazaki et al. | |
| 2014/0222119 A1 | 8/2014 | Pederson et al. | |
| 2014/0298582 A1 | 10/2014 | Kercher et al. | |
| 2015/0048205 A1 | 2/2015 | Seibt et al. | |
| 2015/0266658 A1 | 9/2015 | Tajima | |
| 2015/0358574 A1 | 12/2015 | Henion et al. | |
| 2017/0057637 A1 | 3/2017 | Cole | |
| 2017/0094166 A1 | 3/2017 | Riedel | |
| 2017/0094167 A1 | 3/2017 | Riedel | |
| 2017/0137109 A1 | 5/2017 | Sieben | |
| 2017/0233058 A1 | 8/2017 | Brunaux et al. | |
| 2018/0056846 A1 | 3/2018 | Nasiri | |
| 2018/0265201 A1 | 9/2018 | Carlioz et al. | |

OTHER PUBLICATIONS

International Search Report and Written Opinion dated Dec. 18, 2019 for PCT/US2019/050387.
International Search Report and Written Opinion dated Mar. 24, 2020 for PCT/US2019/050343.
International Search Report and Written Opinion dated Jan. 17, 2020 for PCT/US2019/050367.
International Search Report and Written Opinion dated Mar. 23, 2020 for PCT/US2019/050337.
International Search Report and Written Opinion dated Dec. 13, 2019 for PCTUS2019/050347.
Meyer, David, "Airbus Has a Solution to 17-Hour Flight Hell: Beds in the Cargo Hold", Fortune, Apr. 11, 2018, 2 pages, http://fortune.com/2018/04/11/airbus-zodiac-sleep-cargo-hold/.
Ong, Thuy, "Emirates' new first class suites feature virtual windows and a 'zero-gravity' seat", The Verge, Dec. 1, 2017, 3 pages, https://www.theverge.com/2017/12/1/16723152/emirates-first-class-suites-virtual-windows-zero-gravity-seat.
U.S. Department of Transportation Federal Aviation Administration, Advisory Circular, "Flightcrew Member Rest Facilities", Sep. 19, 2012, AFS-220, AC 117-1, 9 pages.
Flynn, David, Dec. 27, 2013, https://www.ausbt.com.au/the-best-seats-on-a-cathay-pacific-boeing-777-300er-try-the-upstairs-bunk-beds, 1 page.
Bahrami, Ali, Federal Register, vol. 68, No. 74, Apr. 17, 2003, Rules and Regulations, "Overhead Crew Rest Compartments", pp. 18843-18852.
Bahrami, Ali, Federal Register, vol. 77, No. 62, Mar. 30, 2012, Proposed Rules, "Crew Rest Compartments", pp. 19148-19153.

* cited by examiner

BIDIRECTIONAL HATCH FOR PASSENGER REST COMPARTMENT

CROSS-REFERENCE TO RELATED APPLICATIONS

This application claims the benefit under 35 U.S.C. §§ 119 and/or 120 of U.S. Provisional Patent Application Ser. No. 62/729,237, filed Sep. 10, 2018. Said provisional patent application Ser. No. 62/729,237 is herein incorporated by reference in its entirety.

BACKGROUND

Passenger aircraft have incorporated onboard crew rest compartments (CRC) for the short-term use of their pilots or crew. CRCs may include lounge chairs or, more commonly, bunks allowing cabin crew to rest in a lie-flat position when not on duty (e.g., on transoceanic or other long-haul flights requiring multiple shifts). However, CRCs are low-capacity, generally providing no more than six to eight bunks at most. Further, CRCs are generally inaccessible to passengers for security reasons, and may be directly accessible from the cockpit only.

Airlines may wish to provide their economy-class passengers, e.g., those passengers occupying seats in the main cabin as opposed to premium lie-flat convertible seats or enclosed compartments such as partitioned seats or suites, with access to bunk facilities comparable to those provided by a CRC for use on similar long-haul flights. Such bunking facilities, or rest compartments, may be located in overhead rest cabins situated in remote space in the overhead crown area of the aircraft, above the main passenger cabin. It may be necessary to rapidly evacuate the overhead passenger cabin, (e.g., returning passengers to their seats in the main cabin) in anticipation of an impending need to quickly and safely evacuate the aircraft. Accordingly, the overhead rest cabin may require multiple means of entry or egress in such a scenario, or if one means of entry or egress is inaccessible.

While CRCs may be located in overhead remote areas, CRCs tend to be much smaller in scale (e.g., having only enough bunks to accommodate off duty pilots or crew) than the overhead passenger cabin. Further, while some overhead CRCs may include a means of egress to the main deck, such means of egress may involve an unassisted drop into the main cabin, which may not be appropriate for less well trained passengers. For example, U.S. Pat. Nos. 6,003,813 and 9,340,294 disclose escape hatches for crew rest areas that provide for a substantially vertical drop through the hatch, e.g., from an overhead crew rest area to the main passenger cabin, using furniture or partitions within the main passenger cabin, e.g., passenger seats or suite partitions, as steps to the main cabin floor. While such means of descent may not be appropriate for passengers, they may also not provide for safe, reliable means for cabin crew to quickly ascend into the overhead cabin, e.g., if other paths to the overhead cabin are obstructed or unreachable.

SUMMARY

In an aspect, embodiments of the inventive concepts disclosed herein are directed to a bidirectional hatch for a passenger aircraft, allowing, for example, passengers in an overhead crown area of the aircraft to swiftly exit the overhead area to the main cabin, and similarly allowing cabin crew to access the overhead area from the main cabin. The bidirectional hatch includes a hatch panel positioned in the overhead area and having an inner portion and an outer portion (the latter which, from the main cabin, may be configured to blend in with an overhead bin door or ceiling panel before deployment). The hatch panel may be transitioned from a closed state to an open or deployed state (e.g., operated by a passenger or crewmember). Once deployed, the hatch panel may pivot open and a telescoping ladder may deploy from the inner portion of the hatch panel to the main cabin below (e.g., toward the main deck, remaining rigid once reaching the deck). The ladder may allow passengers to descend from the overhead area into the main cabin (e.g., where they may take their assigned seats, in anticipation of major turbulence or an evacuation of the aircraft), while cabin crew may likewise ascend via the ladder into the overhead area (e.g., if their presence or attention is required there).

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
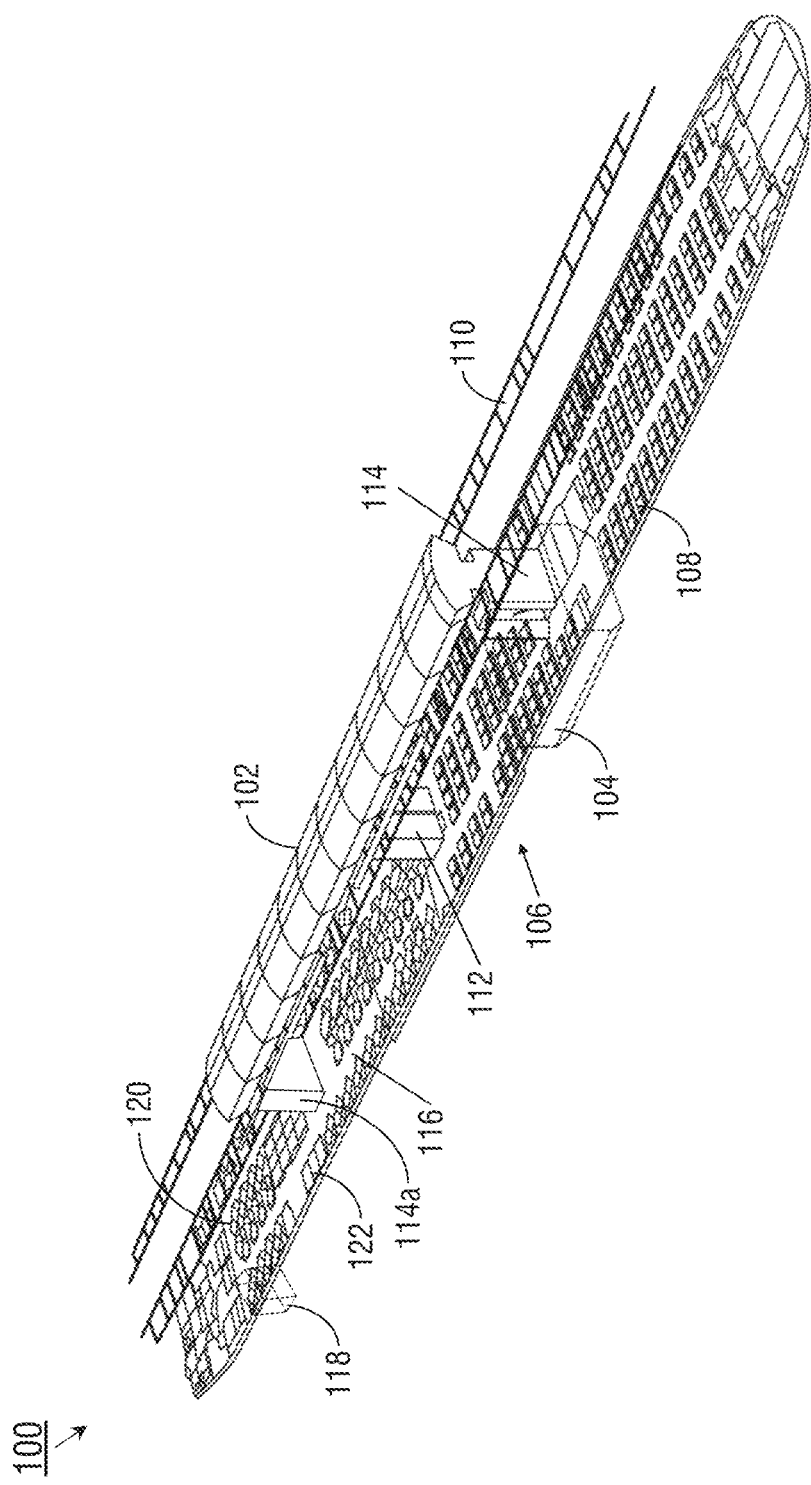
FIG. 1 illustrates an exemplary embodiment of an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a passenger aircraft capable of providing rest compartments for passengers within remote areas of the aircraft. "Remote areas" refers to portions of the aircraft outside the main passenger cabin potentially occupyable by passengers. For example, passenger rest compartments (e.g., berths, bunks) may be incorporated into the overhead crown area of the fuselage, directly above the main passenger cabin. Additionally or alternatively, rest compartments may be incorporated into a lower lobe area under the main passenger cabin, such as a cargo deck. In either case, passenger rest compartments may be incorporated into a larger cabin structure above or below the main passenger cabin and accessible therefrom by passengers, e.g., when the aircraft reaches a safe cruising altitude. Unlike rest cabins dedicated to use by aircraft pilots and cabin crew, the passenger rest cabins may be accessible from the main passenger cabin rather than isolated therefrom. Similarly, the passenger rest cabins and their individual rest compartments may incorporate additional safety features and amenities developed with passenger use in mind.

It is noted herein that an aircraft including an aircraft suite with an overhead passenger rest cabin and a lower lobe passenger rest cabin may be configured to meet or exceed regulatory requirements for crew rest compartments in aircraft as set forth by the Federal Aviation Administration (FAA) of the United States Government. The regulatory requirements may be codified (e.g., including, but not limited to, regulations codified in 14 C.F.R. 25: Airworthiness Standards: Transport Category Airplanes and 14 C.F.R. 117: Flight and Duty Limitations and Rest Requirements: Flightcrew Members). In addition, the regulatory requirement may include special condition regulations set forth for specific aircraft (e.g., including, but not limited to, regulations such as those found in 68 FR 18843: Special Conditions: Boeing Model 777 Series Airplanes; Overhead Crew Rest Compartments, and 79 FR 2359: Special Condition: Airbus Model A350-900 Series Airplane Crew Rest Compartments). Further, the regulatory requirements may be provided in advisory circulars (e.g., including, but not limited to, Advisory Circular AC117-1).

It is contemplated that passenger rest compartments will not be occupied by passengers during taxi, takeoff and landing (TTL) flight segments. Rather, passengers will occupy their assigned seats in the main passenger cabin during said flight segments. When the aircraft reaches a safe cruising altitude (e.g., when passengers are generally permitted to leave their seats), those passengers having access to a rest compartment may be permitted to access their assigned rest compartment if they so choose. Passenger access to rest compartments may be via a dedicated vestibule adjacent to one or more central aisles (e.g., adjacent to, and accessible via, both aisles of a double-aisle aircraft). Access doors in the vestibule may lead to compact staircases or similar means of ascent or descent by which passengers may reach the overhead or lower-lobe rest cabins. Each remote area of the aircraft wherein rest cabins are incorporated (e.g., the overhead crown area or lower-lobe cargo deck) may have a dedicated ascent/descent device, such that the progress of passengers wishing to ascend into an overhead cabin is not obstructed by that of passengers wishing to descend into the lower lobe area. Rest cabins may incorporate a transitional space or landing between the ascent/descent staircase and the individual bunks, which space may include a station space where flight attendants and crew may access emergency equipment storage (e.g., first aid supplies, fire containment bags) and communications facilities. Alternatively, the transitional space may include temporary seating facilities for an on-site crewmember, proximate to storage and facilities. The transitional space may temporarily accommodate a passenger entering or leaving the rest cabin. It is contemplated that under normal conditions, one or more cabin crewmembers may be dedicated to monitoring the rest cabins inflight; however, said crewmembers may remotely monitor the rest cabin from the main deck (e.g., via the aforementioned sensor system), responding to the rest cabin if their attention is required as described below. A flight attendant/crew station as described above may be positioned at either vertical end of a bidirectional entry vestibule, e.g., at the respective entrances to the overhead passenger rest cabin (at its aft end) and the lower lobe rest cabin. Additional crew stations may be positioned, e.g., at the opposing forward end of the overhead passenger rest cabin and in the portion of the lower lobe rest cabin most distant from the entry station. For example, additional lower lobe rest stations may be positioned at the opposing end of a corridor passing through a single lower lobe rest cabin module, or at the point of transition between two adjacent lower lobe rest cabin modules. In some embodiments, a second entry vestibule may be positioned at the forward or terminal end of the overhead passenger rest cabin, via which passengers and crew may enter or exit the overhead passenger rest cabin.

Each rest cabin may include additional access hatches for the emergency use of passengers or crew. Should the aircraft encounter severe turbulence or other adverse conditions, passengers may be instructed to return to the main cabin and occupy their assigned seats. In some cases, cabin crew may advise those passengers occupying rest compartments to remain there, e.g., until it is determined that passengers may safely return to their seats. Each rest compartment may include a bunk occupyable by a passenger in a prone or reclined position, allowing the passenger to rest or sleep therein. Individual bunks may be arranged within a rest cabin so as to maximize the amount of standard bunks within a rest cabin of a given size (e.g., equivalent in volume to a standard cargo compartment) without truncating the size of any individual bunk. For example, two or more bunks may be stacked atop each other within a rest cabin. Individual bunks may be disposed at a fixed angle to others, e.g., substantially parallel or perpendicular to the longitudinal axis (roll axis) of the aircraft. Alternatively, individual bunks may be arranged longitudinally on either side of a central aisle, by which each bunk may be accessed.

It is contemplated that cabin crew may not be physically present to monitor rest cabins in person, although some rest cabins may be configured to include a seating element temporarily occupyable by a crewmember. The rest cabins may be monitored remotely by cabin crew on the main deck, who may be alerted if conditions therein merit a response. For example, "rough" or low-resolution infrared sensors may monitor the rest cabin and individual compartments without intruding upon the privacy of occupying passengers, while visual cameras may monitor common areas of the rest cabin. Sensors and/or cameras may monitor the presence or absence of passengers, movement, and heat signatures, alerting the cabin crew if conditions warrant. If, for example, conditions consistent with an unauthorized presence (e.g., a passenger is present within a rest cabin or rest compartment when s/he should not be), an altercation between passengers, adverse environmental conditions, a medical emergency (e.g., as determined by anomalous movement of a given passenger over time), or a potential fire (e.g., excessive heat persisting over time) are detected, the crew may be alerted or summoned to the rest cabin depending upon the severity of the scenario. Rest cabins may incorporate preventative safety measures in order to prevent or reduce the risk of such emergency scenarios. For example, as the charging of mobile devices (in particular, the rechargeable batteries of cellular phones or tablets) may contribute to the risk of onboard fire, charging devices (e.g., inductive wireless charging devices) may be provided for passengers occupying the rest cabin within a fireproof enclosure, such that a device may not be charged unless placed therein. Such fireproof charging facilities may be placed proximate to an infrared sensor for added safety. Similarly, portable fire containment bags (FCB) will be securely stored throughout the overhead and lower lobe rest cabins for the containment of any mobile devices or batteries thereof determined to be at risk of combustion. Infrared temperature sensors may further be positioned to cover the whole of the common area (e.g., shared spaces or common access corridors). The temperature sensors, in concert with onboard smoke detectors, may determine not only the presence of a fire, but its location, such that cabin crew may respond quickly and passengers evacuated to the main cabin by unobstructed routes.

Each bunk may incorporate a privacy partition and may be equipped with safety features comparable to a main-deck seat, such as a safety belt and deployable oxygen mask, as well as a passenger service unit (PSU) incorporating a positionable reading light, call button, panic button, and adjustable gasper outlet. Each rest compartment may further include a two-way audio connection so that the occupant may communicate with cabin crew. Rest compartments may incorporate work surfaces that fold out or down into the compartment from the wall or ceiling for the temporary use of occupants. As individual rest compartments may lack a physical window, the compartments may incorporate a "virtual window", whereby a display surface connected to exterior cameras or image sensors provides attitude cues to the occupant via externally captured images. The display surface may be embedded into the compartment wall or pivotably attached, such that a single display surface may serve as a virtual window while substantially flush with the wall but may be pivoted out or down for access to the inflight entertainment system.

A passenger rest cabin incorporated into the overhead crown area may be modular (e.g., comprising one or more connected or linked modules), such that the size of the rest cabin may be scaled up or down depending on the size of the embodying aircraft or the desired number of rest compartments. Similarly, one or more modular overhead rest compartments may be easily installed into the aircraft during an outfit or refit, with portions of the modular overhead passenger rest cabins dedicated to electrical, ventilation, or other service connections between modules. The overhead passenger rest cabin may be proportioned to maximize the available space for individual rest compartments and access corridors while minimally intruding upon the space of main cabin passengers. For example, in order to maximize the height of the overhead cabin access corridor, the main cabin ceiling may be lowered, e.g., over the centermost seats. Similarly, main cabin lavatories may be "notched", or partially reduced in height or truncated, to accommodate the overhead passenger rest cabin.

As noted above, it is contemplated that the overhead passenger rest cabin will not be occupied by passengers during any flight segment, or under any conditions, where immediate evacuation of the aircraft may be necessary (e.g., TTL phases or periods of excessive turbulence or other adverse environmental conditions). Accordingly, the overhead passenger rest cabin may be equipped with bi-directional hatches deployable into an aisle of the main cabin. For example, should conditions within the overhead cabin warrant the evacuation of passengers or the rapid intervention of cabin crew, the bi-directional hatches may include access ladders that deploy downward into the main cabin. Passengers may rapidly exit the overhead cabin, and cabin crew may likewise rapidly ascend into the overhead cabin, via the access ladders. Bi-directional hatches may be easily deployable by passengers; e.g., a single lever or button may release the access ladder from its restraints while activating any necessary emergency lights or warnings.

The overhead passenger rest cabins, as noted above, may incorporate individual rest compartments situated along either side of a central corridor and accessible therefrom. It is contemplated that due to the limited interior space available for incorporating the overhead passenger rest cabin into an aircraft interior while minimally intruding upon main cabin space, the central access corridor may be of limited height, such that passengers of average size may not be able to traverse the access corridor without crouching to some extent. Accordingly, the central access corridor may incorporate handholds at regular intervals therealong, sized and placed to reduce strain associated with remaining in a crouched position while traversing the corridor. Similarly, the access corridor may include shifts in lighting or ventilation along its length to prevent claustrophobia; transitional spaces may be positioned along the corridor to "break up" the space.

Similarly to the overhead crown rest cabin, the lower lobe rest cabins may be modular in nature. For example, the lower lobe rest cabins may be sized and shaped to match the proportions of a cargo container, such that one or more such rest cabins may be easily incorporated into the lower cargo deck. The modular rest cabins may likewise include dedicated entry and exit portals and electrical, airflow, and other service connections therebetween, such that the overall amount of available lower lobe bunk space may be scaled up or down as needed or desired. For example, passengers may descend into a first lower lobe rest cabin, which may include transitional space and/or temporary crew seating facilities, and pass therefrom into successive rest cabins through the entry and exit portals. Lower lobe rest cabins may include additional ceiling hatches deployable if rapid evacuation of the rest cabins upward into the main cabin is necessary. In some embodiments, lower lobe rest cabins may include modular pairs of interconnected rest cabins. For example, a first cabin and a second cabin may be interconnected such that a first space within the first cabin and a second adjoining space within the second cabin may be combined into a full size rest compartment or bunk shared between the two cabins, where neither the first space nor the second space would alone be large enough to accommodate a full rest compartment.

Additionally or alternatively, embodiments of the inventive concepts disclosed herein are directed to a passenger aircraft incorporating additional reserved spaces adjacent to, and accessible from, selected lay-flat or tracked aircraft seats. For example, first-class, business-class, or equivalent passengers may be assigned main-deck seats capable of tracking backward or forward, or of reconfiguration into a lay-flat state whereon the passenger may occupy the seat in a prone position. Such lay-flat seats or tracking mechanisms may conceal a hatch set into the main deck floor, whereby the occupying passenger may access a private or semi-private compartment, e.g., on the cargo deck immediately below the main deck. Said private or semi-private compartment (e.g., two adjacent seats may share a compartment) may provide an alternative seating area or bunk area for the passenger while preserving available space on the main deck for other seating facilities; compartments may be windowless but equipped with "virtual windows" as described above.

Referring to FIG. 1, an exemplary embodiment of a passenger aircraft 100 according to the inventive concepts disclosed herein may include overhead passenger rest cabins 102 and lower lobe passenger rest cabins 104. For example, the aircraft 100 may include only overhead passenger rest cabins 102, only lower lobe passenger rest cabins 104, or both. Overhead passenger rest cabins 102 may be incorporated into the overhead crown area of the aircraft 100, above the main passenger cabin 106 (e.g., main deck) and the passenger seats (108), overhead bins (110), and monuments (112) (e.g., storage monuments, galley monuments, audiovisual monuments housing an inflight entertainment system, lavatories). Lavatories, monuments 112, zone dividers, or other structures proximate to the longitudinal center of the main passenger cabin 106 may be notched or otherwise modified to accommodate the overhead passenger rest cabin 102. Similarly, lower lobe passenger rest cabins 104 may be incorporated on a cargo deck directly underneath the main passenger cabin 106. Passengers may access the overhead passenger rest cabins 102 or lower lobe passenger rest cabins 104 via an entry vestibule (114) located within the main passenger cabin 106.

The entry vestibule 114 may connect the overhead passenger rest cabins 102 and the lower lobe passenger rest cabins 104 (when both are incorporated within the aircraft 100) while providing a separate path for passengers to access each rest cabin from the main passenger cabin 106 (e.g., via ascending or descending staircases). It is contemplated that the entry vestibule 114 will be the primary means of passenger access to the overhead passenger rest cabins 102 and the lower lobe passenger rest cabins 104, and the sole means of access during non-emergency conditions. In some embodiments, the entry vestibule 114 may be located at the aft end of the overhead passenger rest cabin 102, and an auxiliary vestibule (114a) may provide a secondary entrance and exit to and from the main passenger cabin 106 and the overhead passenger rest cabin 102. The overhead passenger rest cabins 102 may include additional escape hatches (not shown) providing an emergency escape route (e.g., to main aisles (116) of the main passenger cabin 106) for passengers to rapidly exit the overhead passenger rest cabins. The lower lobe passenger rest cabins 104 may similarly include escape hatches for emergency return to the main passenger cabin 106. In some embodiments, the aircraft 100 may incorporate additional lower lobe rest compartments (118) situated on the lower cargo deck. For example, the additional lower lobe rest compartments may be located substantially underneath selected partitioned premium seats (120) or premium compartments (122) in premium seating sections of the aircraft 100 and accessible to the occupants of said premium seats or premium compartments (e.g., during safe cruising segments) via proximate hatches in the main deck floor.

Figure 2:
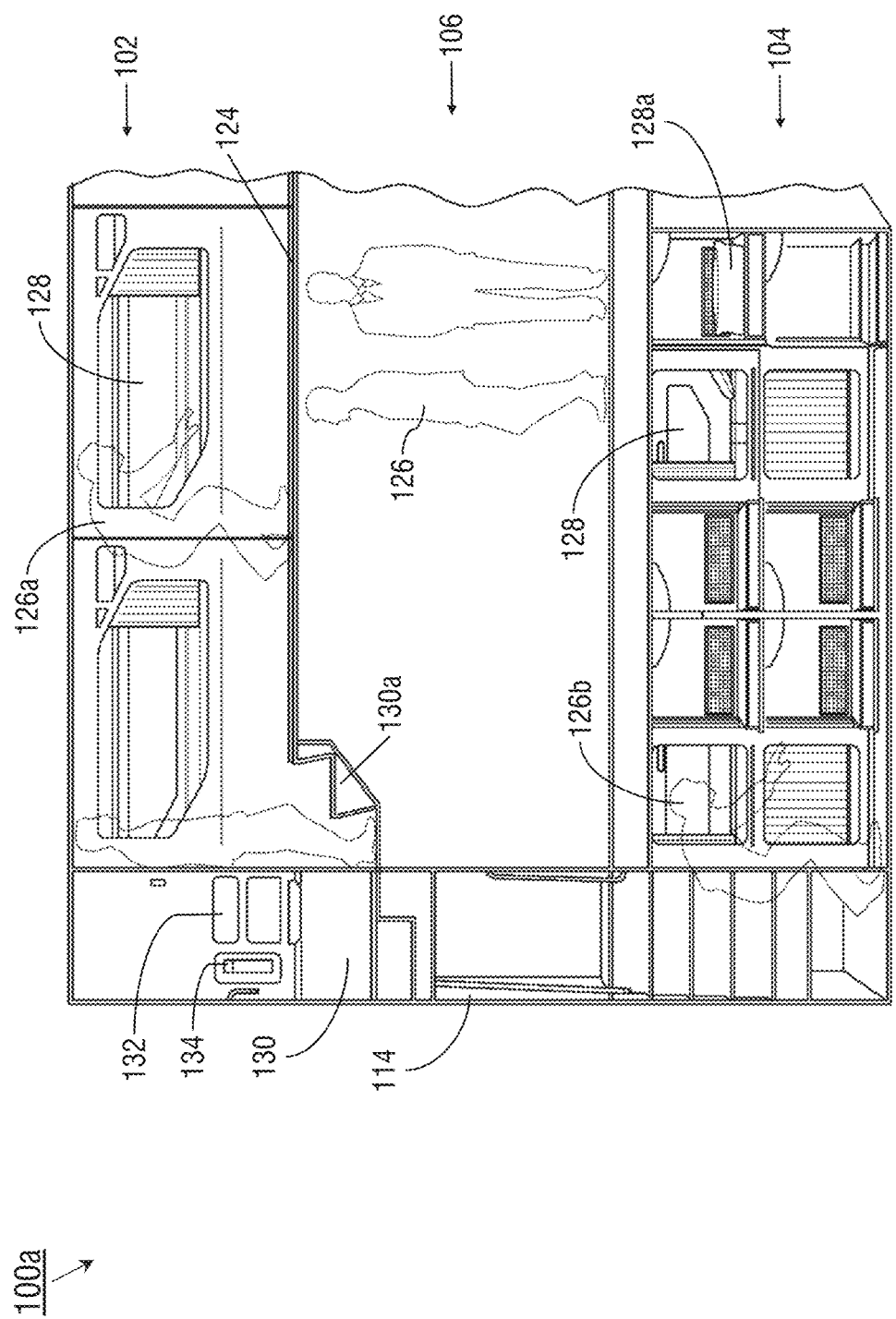
FIG. 2 is a partial cross-section view of the aircraft of FIG. 1.

Referring to FIG. 2, the passenger aircraft 100a may be implemented and may function similarly to the aircraft 100 of FIG. 1, except that the aircraft 100a may include an overhead passenger rest cabin 102 and a lower lobe passenger rest cabin 104 connected by an entry vestibule 114 to the main passenger cabin 106. For example, the overhead passenger rest cabin 102 may be incorporated into remote space above the main passenger cabin 106 such that the floor of the central corridor (124) of the overhead passenger rest cabin corresponds substantially to the ceiling of the main passenger cabin 106 (e.g., over the centermost portion of the main cabin). The height of the overhead passenger rest cabin 102 that a passenger (126) of average height may remain comfortably standing, e.g., in a main aisle (118, FIG. 1) of the main passenger cabin. However, space limitations within the aircraft 100a may require passengers (126a-b) respectively traversing the overhead passenger rest cabin 102 and lower lobe passenger rest cabin 104 to do so in a partially crouched position. The overhead passenger rest cabin 102 may include individual passenger rest compartments (128) or bunks extending along either side of the central corridor 124, substantially parallel to the longitudinal or roll axis of the aircraft 100a. The overhead passenger rest cabin 102 may include a transitional space (130) between the entry vestibule 114 and the central corridor 122; the transitional space may include emergency equipment storage (132) and an emergency handset (134) for communicating with the cockpit or cabin crew, or additional steps (130a) linking the entry vestibule and the central corridor. Similarly, the lower lobe passenger rest cabin 104 may incorporate individual passenger rest compartments 128 aligned substantially parallel to the roll axis as well as passenger rest compartments (128a) aligned at an angle to the roll axis, e.g., perpendicular to the roll axis or substantially parallel to the pitch axis of the aircraft 100a.

Figure 3A:
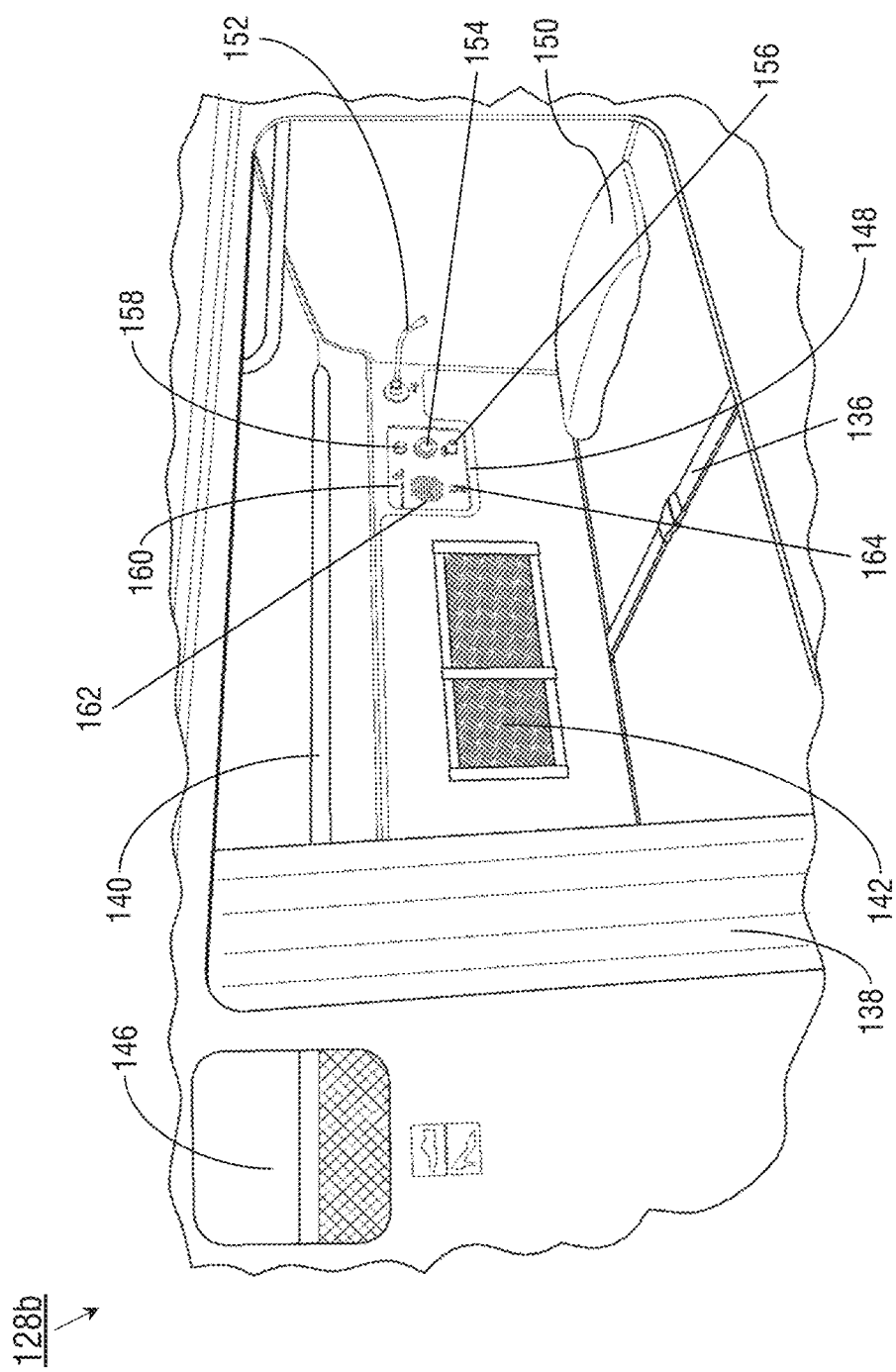
FIGS. 3A and 3B are respectively head-end and foot-end isometric views of a passenger rest compartment of the aircraft of FIG. 1.
Figure 3B:
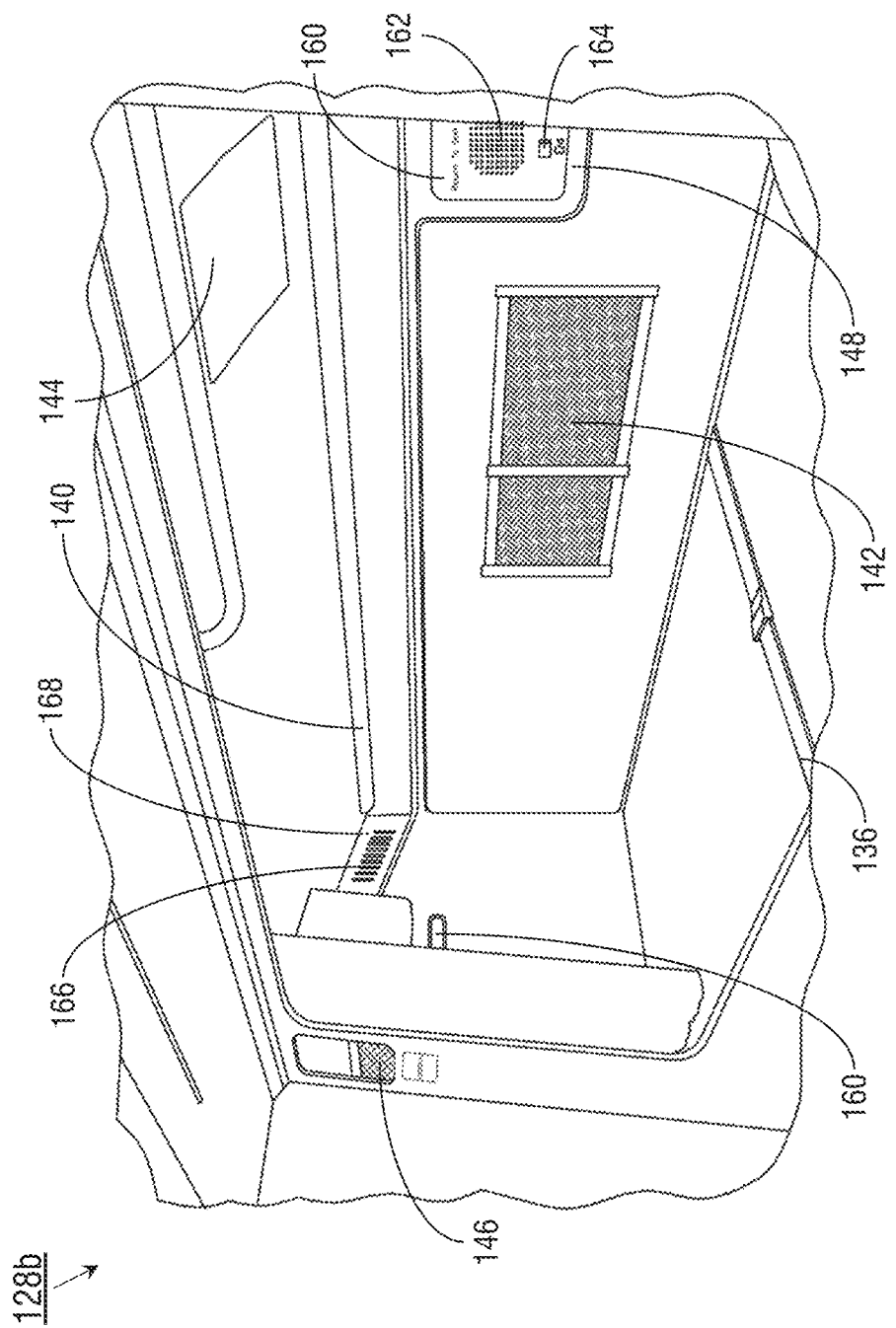

Referring to FIGS. 3A and 3B, the passenger rest compartment 128b (bunk) may be implemented and may function similarly to the passenger rest compartments 128, 128a of FIG. 2, except that the passenger rest compartment 128b may include a safety belt 136, a privacy partition 138 (e.g., privacy curtain), ambient lighting 140, interior stowage compartments 142, an emergency oxygen drop 144, ventilated shoe stowage compartments 146 (which may, for example, be situated or accessed immediately outside or adjacent to the rest compartment), and a passenger service unit 148 (PSU). For example, the PSU 148 may be positioned proximate to the head end of the rest compartment 128b (e.g., where a pillow 150 may be provided for the passenger's head). The PSU 148 may include a positionable reading light 152 and gasper outlet 154, temperature controls 156, a crew call button 158, lighted signage 160 (e.g., signaling the occupying passenger to return to his/her seat, fasten his/her safety belt 136, no smoking). The PSU may further include a speaker/microphone 162 and call button 164 allowing two-way audio communication between the occupying passenger and the cabin crew. Referring in particular to FIG. 3B, the foot end of the passenger rest compartment 128b may include an air return 166 and infrared sensors 168.

Figure 4:
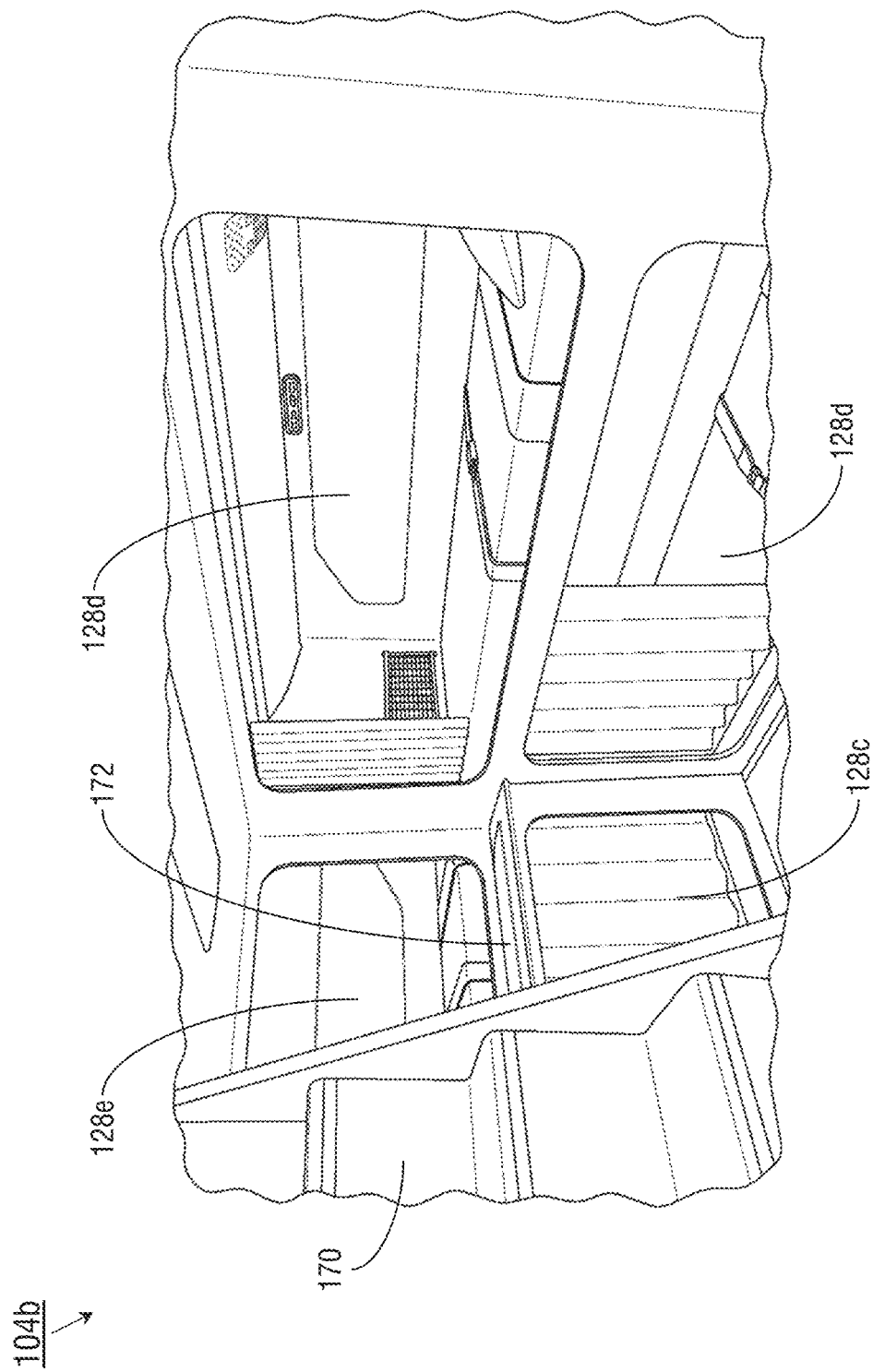
FIG. 4 is a partial isometric view of a lower lobe passenger rest cabin of the aircraft of FIG. 1.

Referring to FIG. 4, the lower lobe passenger rest cabin 104a may be implemented and may function similarly to the lower lobe passenger rest cabin 104 of FIG. 2, except that the lower lobe passenger rest cabin 104a may be accessed by a descending staircase (170) connecting the lower lobe passenger rest cabin to the entry vestibule (114, FIG. 2) and thereby to the main passenger cabin (106, FIG. 2). For example, the staircase 170 may descend into the center of the lower lobe passenger rest cabin 104a at a predetermined angle. The passenger rest compartments 128c-e may be implemented and may function similarly to the passenger rest compartments 128b of FIGS. 3A/B, except that the passenger rest compartments 128c, 128e and the passenger rest compartment 128d may be respectively oriented substantially parallel or at an angle to (e.g., substantially perpendicular to) the longitudinal/roll axis of the aircraft (100, FIG. 1) and positioned around the perimeter of the lower lobe passenger rest cabin 104a. The passenger rest compartments 128d may be positioned in substantially vertical stacks of two or more bunks, depending on the height of the bunks relative to the height of the lower lobe passenger rest cabin 104a. The passenger rest compartment 128e, for example, may be stacked atop the passenger rest compartment 128c in a staggered fashion, set back from the passenger rest compartment 128 by a shelf (172). For example, the passenger rest compartment 128e may combine space from two adjacent modular lower lobe passenger rest cabins 104a, where neither rest cabin on its own may include sufficient space for a full passenger rest compartment. Lower lobe passenger rest cabins 104, 104a may be proportioned for a form factor compatible with standard cargo containers; individual lower lobe passenger rest cabins may be palletized or otherwise capable of addition to, or removal from, the aircraft 100 via the existing cargo loading/unloading system. Further, depending on size, configuration, and desired capacity, the aircraft 100 may incorporate lower lobe passenger rest cabins (104a) either forward or aft of the lower lobe passenger rest cabin 104 connected to the main passenger cabin 106 via the entry vestibule 114.

Figure 5:
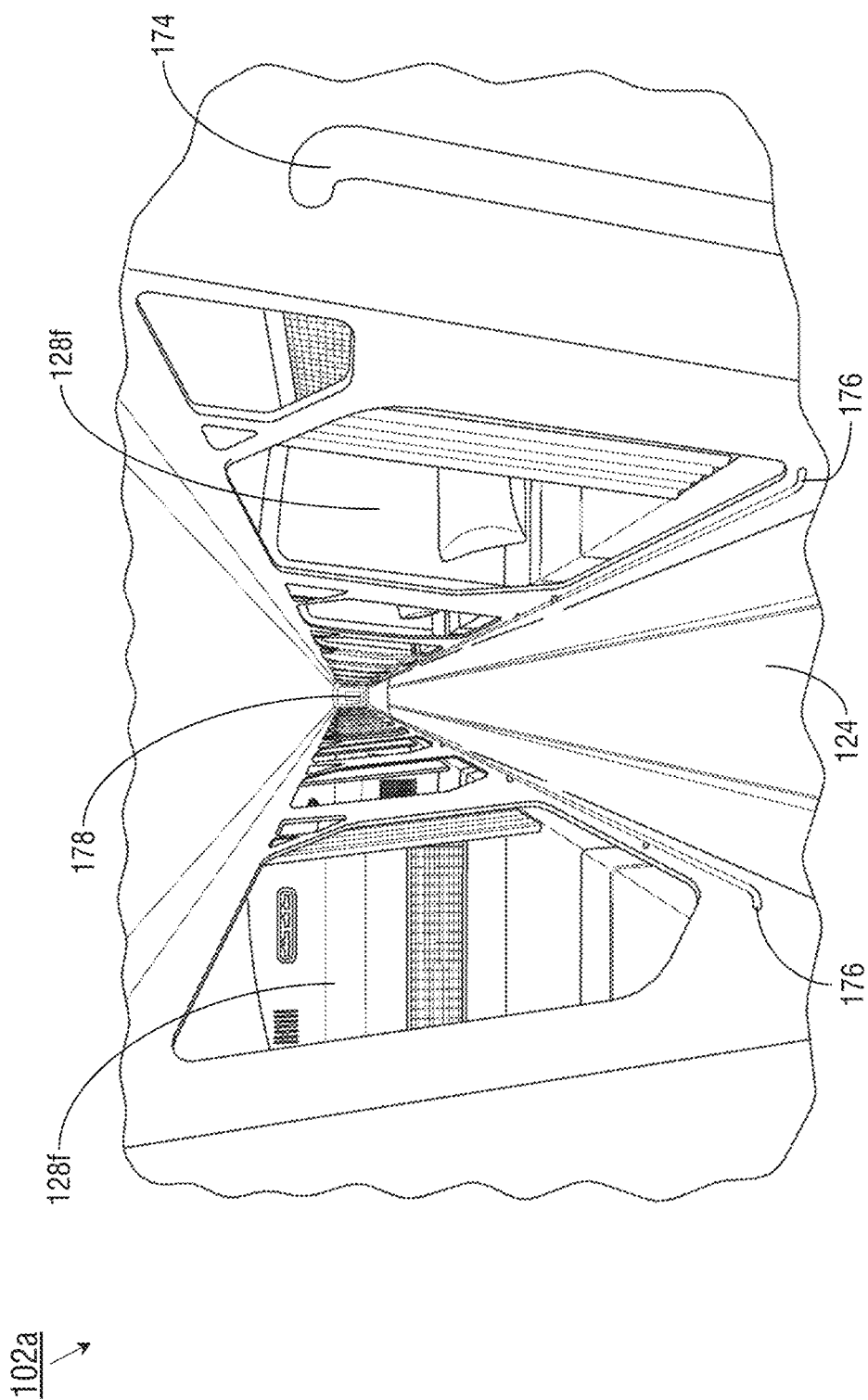
FIG. 5 is a partial longitudinal view of an overhead passenger rest cabin of the aircraft of FIG. 1.

Referring to FIG. 5, the overhead passenger rest cabin 102a and individual rest compartments 128f may be implemented and may function similarly to the overhead passenger rest cabin 102 of FIG. 2 and the individual rest compartments 128c-e of FIG. 4, except that the individual passenger rest compartments 128f of the overhead passenger rest cabin 102a may be sequentially arranged along either side of the central corridor 124 extending forward (e.g., substantially parallel to the longitudinal/roll axis of the aircraft (100, FIG. 1). For example, the overhead passenger rest cabin 102a may comprise twenty (20) passenger rest compartments 128f: ten compartments on the port side of the central corridor 124 and ten opposite compartments on the starboard side. The transitional space (130, FIG. 2) between the entry vestibule (114, FIG. 2) and the overhead passenger rest cabin 102a may include handles (174) graspable by cabin crew or passengers entering the overhead passenger rest cabin via the entry vestibule. Further, graspable handles (176) may be spaced along the central corridor 124; passengers (126a, FIG. 2) traversing the central corridor (e.g., after entering the overhead passenger rest cabin 102a via the entry vestibule 114 and proceeding to their assigned passenger rest compartment 128f) may use the graspable handles to reduce strain while traversing the central corridor in a crouched position. A crew station 178 may be located at the forward end of the overhead passenger rest cabin 102 (including, e.g., emergency storage for first aid and fire containment supplies, communications facilities, and/or temporary jump seating). Similar crew stations may be located within the transitional space (130, FIG. 2) at the aft end of the overhead passenger rest cabin 102 and throughout the lower lobe passenger rest cabin (104, FIG. 4; e.g., proximate to the staircase or the point at which the entry vestibule 114 enters the lower lobe passenger rest cabin).

Figure 6A:
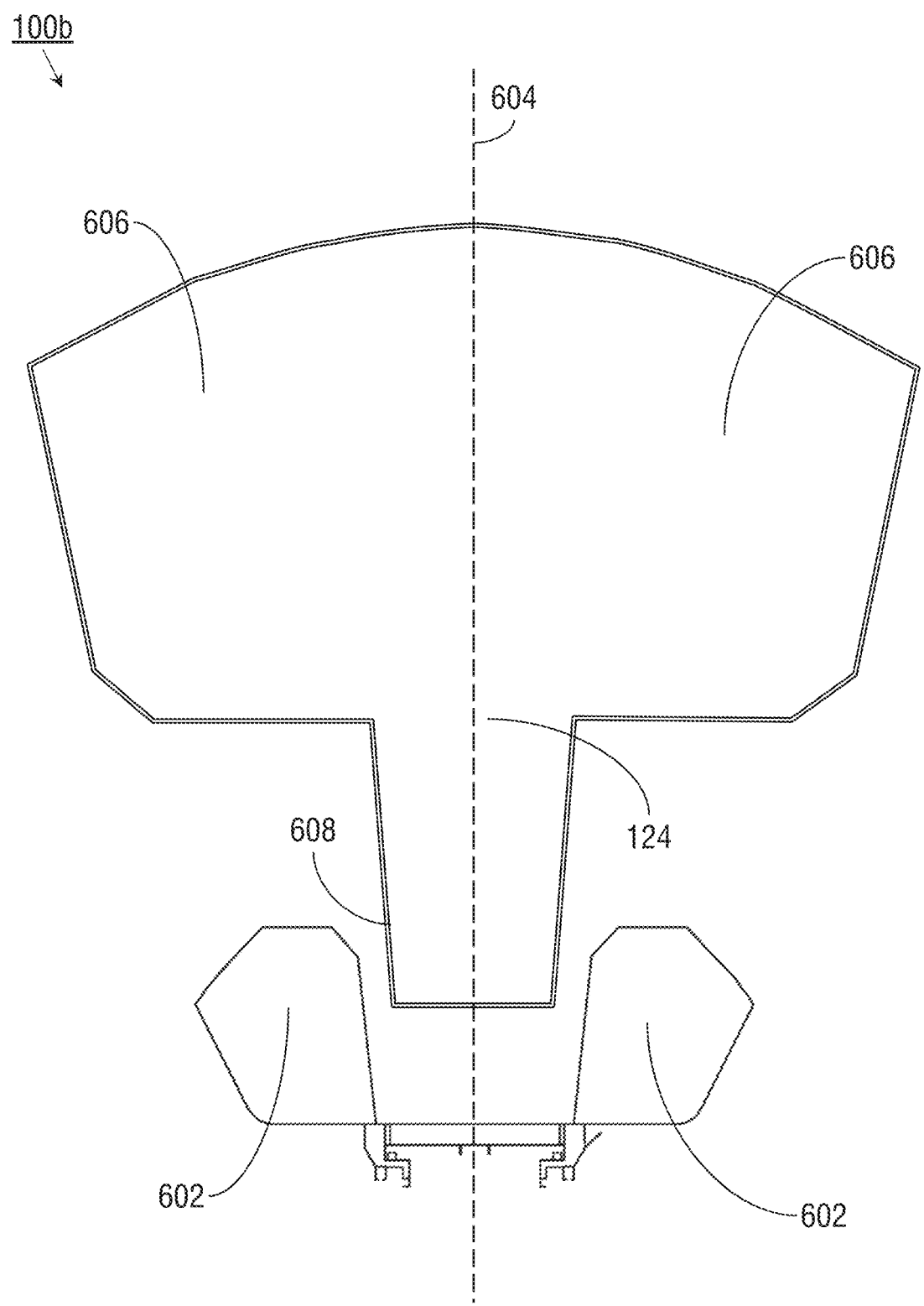
FIG. 6A is a forward cross-section view of the overhead passenger rest cabin of the aircraft of FIG. 1.

Referring to FIG. 6A, the aircraft 100b may be implemented and may function similarly to the aircraft 100a of FIG. 1, except that the overhead passenger rest cabin 102 of the aircraft 100b may be incorporated into overhead crown space above two opposing rows of overhead bins 602 on either side of a centerline 604 of the aircraft. The overhead cabin may include passenger compartment space 606 within which may be incorporated individual passenger rest compartments (128f, FIG. 5) on either side of the central corridor 124. The central corridor 124 may include substantially vertical sidewalls (608) separating the passenger compartment spaces 606 from the floor of the central corridor. Accordingly, an emergency egress hatch allowing passengers to quickly return to the main passenger cabin (106, FIG. 1; and, similarly, allowing cabin crew to enter the overhead passenger rest cabin 102) may be incorporated into a sidewall 608 or a passenger compartment 606. Similarly, the egress hatch may be configured to allow entry into the main passenger cabin 106 via a hatch deployable from within the overhead passenger rest cabin 102. From within the main passenger cabin 106, the outward appearance of the hatch may appear substantially similar to that of an overhead bin 602, blending in with adjacent ceiling panels or overhead bin doors (except that, for example, the hatch may not include a handle operable from within the main passenger cabin, the handle otherwise configure to open the overhead bin).

Figure 6B:
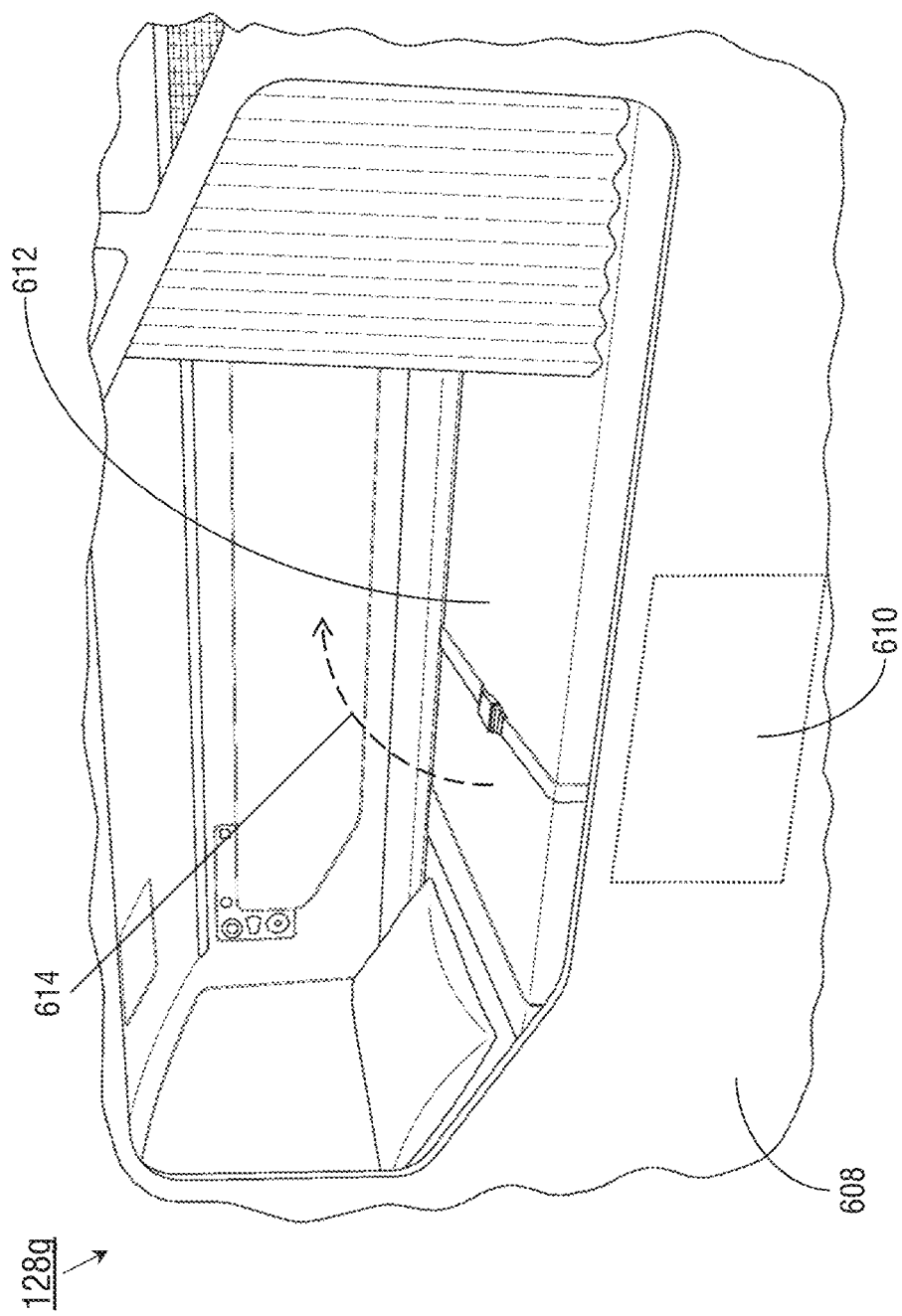
FIG. 6B is an isometric view of a passenger rest compartment of the overhead passenger rest cabin of FIG. 6A.

Referring to FIG. 6B, the passenger rest compartment 128g may be implemented and may function similarly to the passenger rest compartment 128f of FIG. 5, except that the passenger rest compartment 128g may provide entry to an egress hatch via a removable panel 610 within the sidewall 608. Similarly, access to the egress hatch may be situated under a bunk 612 or mattress within the passenger rest compartment 128g. By rotating the bunk 612 upward (614), a passenger or crewmember may access the egress hatch.

Figure 7:
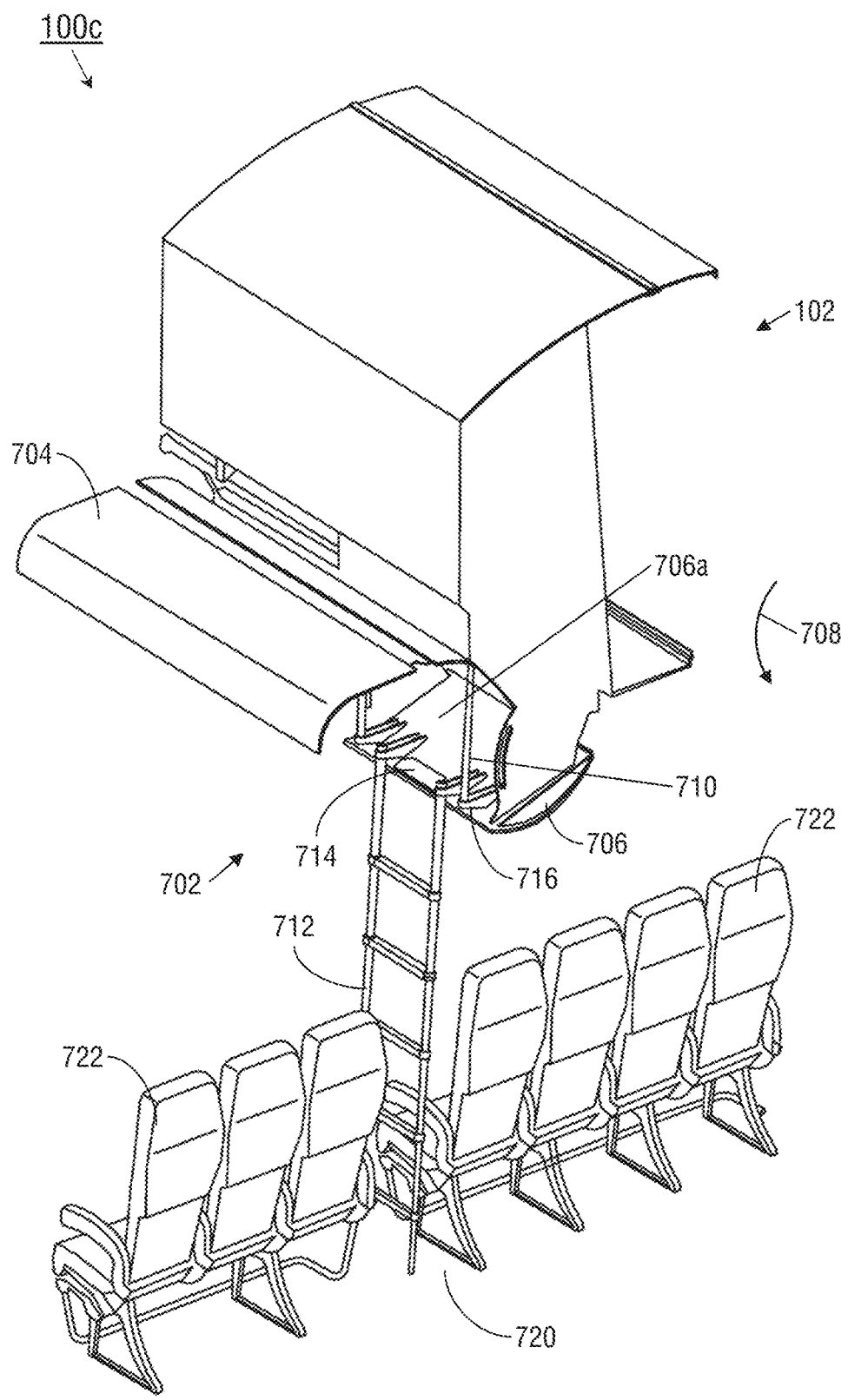
FIG. 7 is an overhead isometric view of a bi-directional hatch of the aircraft of FIG. 1.

Referring to FIG. 7, the aircraft 100c may be implemented and may function similarly to the aircraft 100b of FIG. 6, except that the aircraft 100c may include an egress hatch (702) deployable from within the overhead passenger rest cabin 102. For example, when the hatch 702 is deployed, the secondary hatch 704 (e.g., outer hatch, upper hatch) may deploy by pivoting upward into the main passenger cabin 106 while the inner primary hatch 706 (e.g., inner hatch, lower hatch) swings downward (708) to create an egress passage from the overhead passenger rest cabin 102 into the main passenger cabin. The primary hatch 706 may be supported by struts (710) in its deployed or open configuration. Additionally, when the hatch 702 is deployed, an aircraft-quality (e.g., FAA certified) telescoping ladder (712) or other like means of descent may deploy from the primary hatch 706 into the main passenger cabin 106. The primary hatch 706 may have an interior surface (706a; e.g., the surface facing the overhead passenger rest cabin 102 when the hatch 702 (and thus the primary hatch is in a non-deployed or "closed" configuration. The interior surface may include anti-skid step treading (714) and a ladder mount (716) from which the telescoping ladder 712 is configured to descend. The ladder mount 716 may include rotary dampers (718) or similar damping devices to regulate the speed with which the telescoping ladder 712 deploys to the floor of the main passenger cabin 106. The egress hatch 702 may deploy, for example, into an aisle 720 between groups of seats (722) in the main passenger cabin. In some embodiments, the egress hatch 702 may be positioned so as to deploy into a cross aisle, e.g., an aisle extending substantially laterally from port to starboard, parallel to the pitch axis of the aircraft 100c. Cross aisles may extend between emergency exit doors on either side of the aircraft 100c, dividing sections of the aircraft, such that the cross aisles are likely to be unobstructed under conditions when the egress hatch 702 may be deployed.

Figure 8:
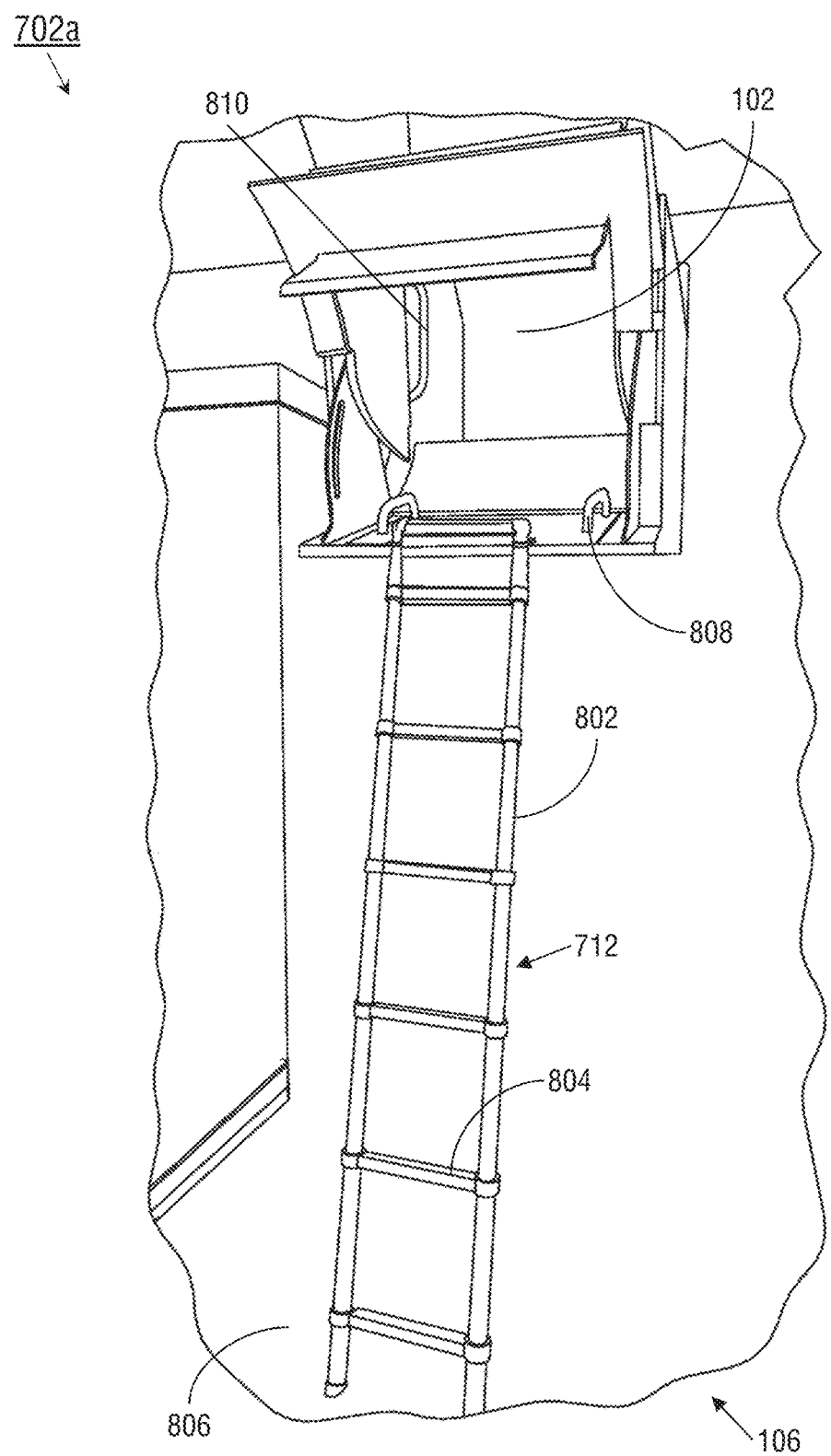
FIG. 8 is a forward isometric view of the bi-directional hatch of FIG. 7.

Referring to FIG. 8, the egress hatch 702a may be implemented and may function similarly to the egress hatch 702 of FIG. 7, except that the telescoping ladder 712 of the egress hatch 702a may incorporate load-bearing telescopic struts 802 connected by rungs 804. For example, the load-bearing telescopic struts 802 may remain in a rigid state once the telescopic ladder 712 reaches the floor (806) of the main passenger cabin 106, such that the telescopic ladder cannot be easily dislodged by passenger traffic within the main passenger cabin and cabin crew can thereby ascend into the overhead passenger rest cabin 102. The interior surface 706a of the primary hatch 706 may include additional graspable handles (808), e.g., for use by cabin crew ascending the telescoping ladder 712 into the overhead passenger rest cabin 102. Similarly, the overhead passenger rest cabin 102 may include handles (810) proximate to the egress hatch 702a for the use of individuals entering the egress hatch 702a via the overhead passenger rest cabin.

Figure 9:
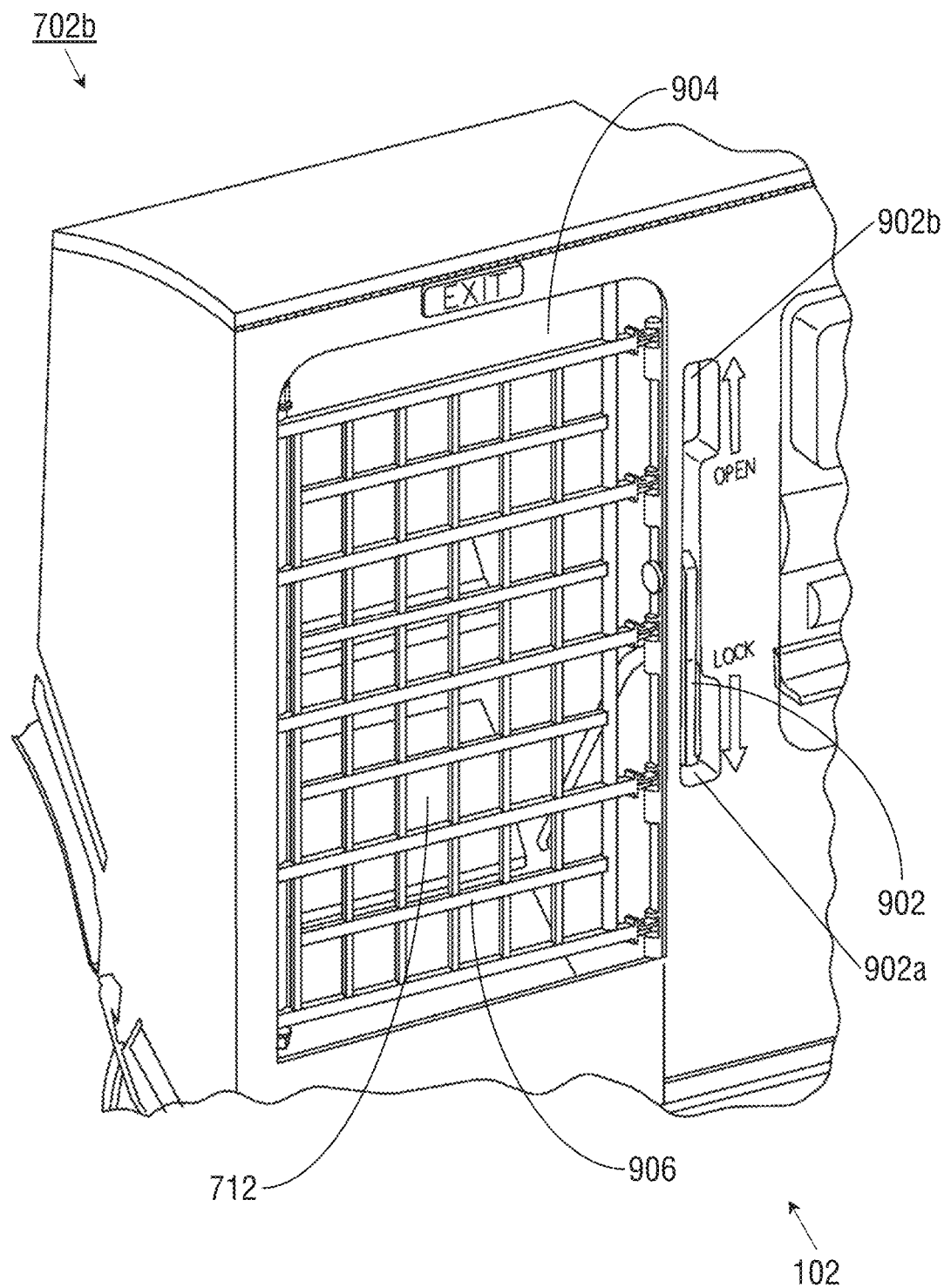
FIG. 9 is an overhead isometric view of the bi-directional hatch of FIG. 8 as seen from the overhead passenger rest cabin.

Referring to FIG. 9, the egress hatch 702b may be implemented and may function similarly to the egress hatch 702a of FIG. 8, except that the egress hatch 702b may be activated by a passenger from within the overhead passenger rest cabin 102 via a lever (902) or similar activation device situated within the overhead passenger rest cabin and directly proximate to the telescoping ladder 712. It is contemplated that the egress hatch 702b may be easily and immediately activated by a passenger or other individual without any particular special training, deploying the egress hatch with a single motion (e.g., sliding the lever 902 from a "locked" setting 902a to an "open" setting 902b). In some embodiments, the egress hatch 702b may be remotely deployable (e.g., from a cabin crew station within the main passenger cabin (106, FIG. 1) from outside the overhead passenger rest cabin 102. In some embodiments, the egress hatch 702b may auto-deploy; e.g., if sensors within the overhead passenger rest cabin 102 detect conditions warranting swift evacuation of the overhead passenger rest cabin 102 to the main passenger cabin 106, such as a fire.

The telescoping ladder 712 may be situated in an opening 904 of the egress hatch 702b, the opening of sufficient size to meet any applicable regulations. The opening 904 may include a safety net 906 or other like safety barrier protecting the telescoping ladder 712 from the overhead passenger rest cabin 102, and from passengers and individuals therein. When a passenger activates the egress hatch 702b by actuating the lever 902, the telescoping ladder 712 may deploy into the main passenger cabin 106 and the safety net 906 may be released, providing unobstructed passenger access to the telescoping ladder via the opening 904. Passengers may descend into the main passenger cabin 106 via the telescoping ladder 712. Any emergency lights or warnings associated with the activation of the egress hatch 702b may automatically activate upon actuation of the lever 902.

Figure 10B:
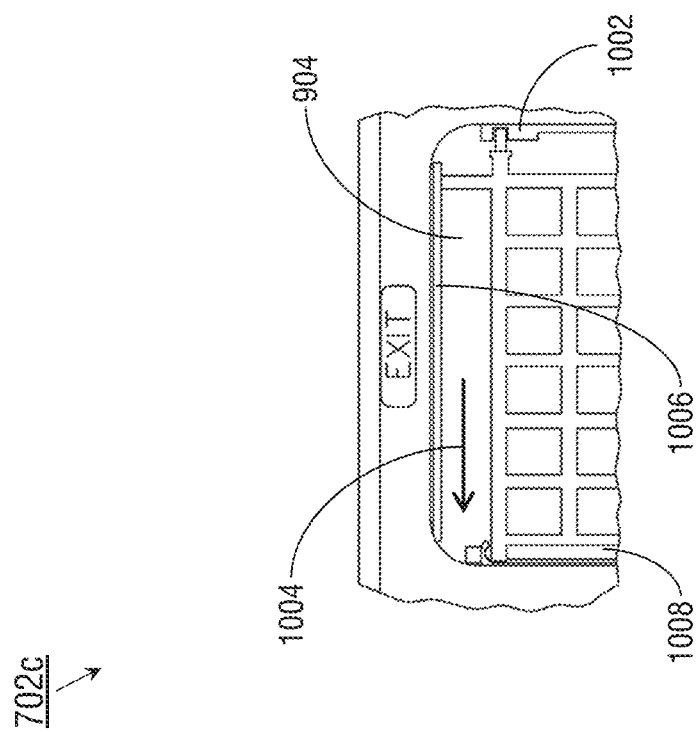
FIGS. 10A and 10B are inset views of the bi-directional hatch of FIG. 9.
Figure 10A:
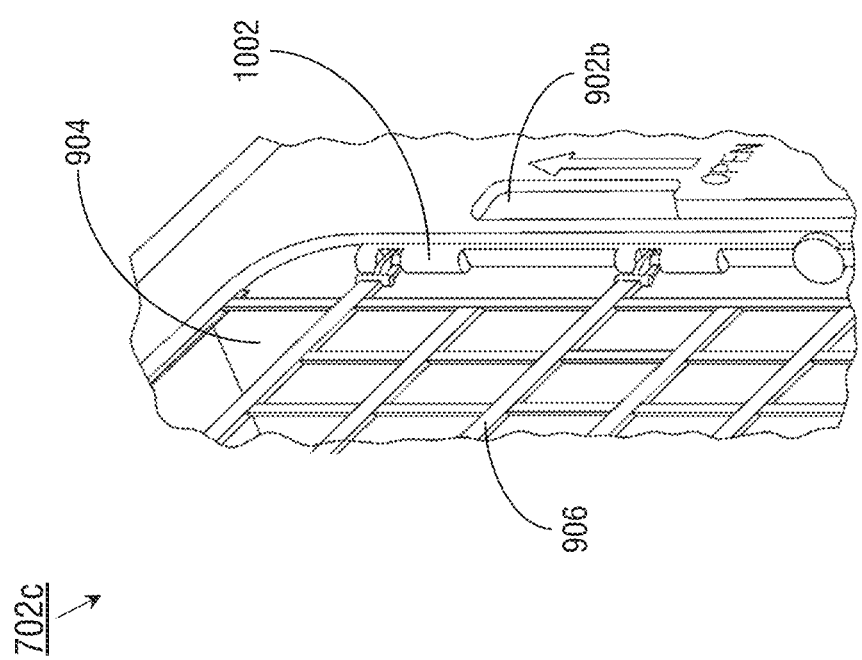

Referring to FIGS. 10A and 10B, the egress hatch 702c may be implemented and may function similarly to the egress hatch 702b of FIG. 9, except that the egress hatch 702c may include one or more gang bolts 1002 securing the safety net 906 in place across the opening 904. When the lever (902, FIG. 9) is actuated from the locked position (902a, FIG. 9) to the open position 902b to activate the egress hatch 702c, the gang bolts 1002 may release the safety net 906. The safety net 906 may be carried (1004) across the opening 904 on a track 1006 where it may be secured out of the way of the opening by a spring-tensioned netting spool 1008. The telescoping ladder (712, FIG. 9) and safety net 906 may be manually repositioned for subsequent uses of the egress hatch 702c.

Embodiments of a bi-directional hatch according to the inventive concepts disclosed herein may provide alternative means of bi-directional passage between overhead passenger rest cabins and the main passenger cabin, e.g., if conditions require the swift evacuation of the overhead cabin into the main cabin or if another means of passage between the main cabin and overhead cabin (e.g., an entry vestibule) is obstructed or otherwise unusable. The bi-directional hatch may further allow cabin crew to quickly ascend into the overhead cabin if their presence is needed. Additionally or alternatively, the bi-directional hatch may be implemented within a monument or vestibule, or other like spaces within the aircraft. The bi-directional hatch may be compliant with any and all existing federal regulations for use within a variety of aircraft configurations. Similarly, the bi-directional hatch may be deployed as a means of swift egress from the main passenger cabin into a lower lobe region of the aircraft, e.g., a cargo deck situated under the main cabin.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A bidirectional hatch for a passenger aircraft, comprising:
   at least one hatch panel disposed in an overhead area of an aircraft and capable of transitioning from a closed state to an open state when the hatch is activated, the hatch panel having an inner portion and an outer portion;
   and
   at least one ascent/descent device coupled to the inner portion, the ascent/descent device including a telescoping ladder comprising at least two telescoping vertical rails connected by a plurality of rungs, the rails and the rungs fashioned of a rigid material, the telescoping ladder configured to:
   deploy toward a deck located beneath the overhead area when the hatch is activated;
   and
   remain in a rigid state when the telescoping ladder has deployed toward the deck;
   the ascent/descent device configured to, in its deployed state, allow at least one individual to 1) descend from the overhead area to the deck and 2) ascend from the deck to the overhead area.

2. The bidirectional hatch of claim 1, further comprising:
   at least one rail fixed to the inner portion on either side of the ascent/descent device, the rail configured to be grasped by the individual.

3. The bidirectional hatch of claim 1, wherein:
   the deck includes at least one passenger cabin including at least one of a ceiling panel and an overhead bin usable by a passenger, the overhead bin accessible via a bin door;
   and
   the outer portion is configured to appear substantially identical to at least one of the bin door and the ceiling panel.

4. The bidirectional hatch of claim 3, wherein the ascent/descent device is configured to deploy into an aisle within the passenger cabin.

5. The bidirectional hatch of claim 4, wherein the aisle includes one or more of:
   a longitudinal aisle substantially parallel to a longitudinal or roll axis of the aircraft;
   and
   a cross aisle substantially parallel to a lateral or pitch axis of the aircraft.

6. The bidirectional hatch of claim 1, wherein the at least one hatch panel is a primary hatch, further comprising:
   at least one second hatch configured to pivot toward an adjacent ceiling panel of the aircraft when transitioning from the closed state to the open state.

7. The bidirectional hatch of claim 1, wherein the overhead area includes an overhead passenger cabin comprising one or more passenger compartments accessible via a corridor.

8. The bidirectional hatch of claim 7, wherein the inner portion is accessible from the overhead passenger cabin via a removable panel disposed within the corridor.

9. The bidirectional hatch of claim 7, wherein:
   at least one of the one or more passenger compartments includes a bunk capable of accommodating at least one passenger;
   and
   the inner portion is accessible from the passenger compartment via the bunk.

10. The bidirectional hatch of claim 1, wherein the ascent/descent device includes at least one damper device configured to regulate a rate of deployment of the ascent/descent device.

11. The bidirectional hatch of claim 1, wherein the hatch is capable of activation by the individual via an activation device disposed within the overhead area.

12. The bidirectional hatch of claim 1, wherein the hatch is automatically deployable.

13. The bidirectional hatch of claim 1, wherein the hatch is remotely deployable.

14. The bidirectional hatch of claim 1, wherein the ascent/descent device is stored behind a safety barrier when not in its deployed state, the safety barrier releasable when the hatch is activated.

15. The bidirectional hatch of claim 14, wherein the safety barrier includes a safety net.

16. The bidirectional hatch of claim 1, wherein the inner portion is at least partially covered by an anti-skid surface.

17. The bidirectional hatch of claim 1, wherein the bidirectional hatch is disposed within a monument.

18. The bidirectional hatch of claim 1, wherein the bidirectional hatch is disposed within an entry vestibule connecting the overhead area and the deck.

* * * * *